(12) United States Patent
Simpkins et al.

(10) Patent No.: US 9,411,428 B2
(45) Date of Patent: Aug. 9, 2016

(54) 3D POINTING DEVICES WITH KEYBOARDS

(75) Inventors: Daniel S. Simpkins, Bethesda, MD (US); Frank A. Hunleth, Rockville, MD (US); Kris Carter, Arlington, VA (US)

(73) Assignee: HILLCREST LABORATORIES, INC., Rockville, MD (US)

( * ) Notice: Subject to any disclaimer, the term of this patent is extended or adjusted under 35 U.S.C. 154(b) by 1969 days.

(21) Appl. No.: 11/700,507

(22) Filed: Jan. 31, 2007

(65) Prior Publication Data

US 2007/0176896 A1   Aug. 2, 2007

Related U.S. Application Data

(60) Provisional application No. 60/763,620, filed on Jan. 31, 2006.

(51) Int. Cl.
| | |
|---|---|
| *G06F 3/033* | (2013.01) |
| *G06F 3/023* | (2006.01) |
| *G06F 3/02* | (2006.01) |
| *G06F 3/0346* | (2013.01) |
| *G06F 3/038* | (2013.01) |
| *H04N 5/44* | (2011.01) |
| *H04N 21/422* | (2011.01) |

(52) U.S. Cl.
CPC ............ *G06F 3/0231* (2013.01); *G06F 3/0213* (2013.01); *G06F 3/0346* (2013.01); *G06F 3/0383* (2013.01); *H04N 5/4403* (2013.01); *H04N 21/42214* (2013.01); *H04N 21/42222* (2013.01)

(58) Field of Classification Search
CPC ..................................................... G06F 3/0213
USPC ........................................................... 345/157
See application file for complete search history.

(56) References Cited

U.S. PATENT DOCUMENTS

| | | | |
|---|---|---|---|
| 5,440,326 A | 8/1995 | Quinn | |
| 5,491,784 A * | 2/1996 | Douglas ............... | G06F 3/0481 715/776 |
| 6,038,614 A * | 3/2000 | Chan et al. ...................... | 710/1 |
| 7,239,301 B2 | 7/2007 | Liberty et al. | |
| 2001/0002126 A1 | 5/2001 | Rosenberg et al. | |
| 2004/0135819 A1* | 7/2004 | Maa ...................... | G06F 3/0481 715/840 |
| 2004/0263479 A1* | 12/2004 | Shkolnikov .................. | 345/169 |
| 2004/0268393 A1 | 12/2004 | Hunleth et al. | |
| 2005/0104867 A1 | 5/2005 | Westerman et al. | |
| 2005/0219213 A1 | 10/2005 | Cho et al. | |

OTHER PUBLICATIONS

International Search Report for PCT/US07/02622 mailed Feb. 7, 2008.
Written Opinion for PCT/US07/02622 mailed Feb. 7, 2008.

* cited by examiner

*Primary Examiner* — Towfiq Elahi
(74) *Attorney, Agent, or Firm* — Patent Portfolio Builders PLLC

(57) ABSTRACT

A 3D pointing device includes a keyboard for character entry. In pointing mode, data from at least one motion sensor is provided, e.g., to be transmitted to a user interface for movement of a cursor. In text entry mode, data from at least one depressed key is provided, e.g., to be transmitted to a user interface for display thereon.

5 Claims, 6 Drawing Sheets

3D POINTING DEVICES WITH KEYBOARDS

BACKGROUND

The present invention relates 3D pointing devices, as well as systems and methods which include 3D pointing devices.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds and eventually thousands of channels of shows and information. Video-on-demand technology takes this breadth of content choice even further, providing the potential for in-home selection from tens of thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide, which was formatted, for example, as series of columns and rows that showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions have not changed much over the last 20-30 years. Grid-based electronic program guides and the multiple button remote control with up/down/right/left navigation is still the most prevalent channel/content selection mechanism. The reaction of those who design and implement the TV user interface to the increase in available media content has been a straightforward extension of the existing selection procedures and interface objects. Thus, the number of rows in the electronic program guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the growth of Internet-delivered content, where the standard navigation methodology is search. As Internet-delivered content migrates to the television, there is a growing need to allow users to type in alpha-numeric information to search for specific content, or content with specific characteristics (e.g., movies with Tom Hanks). Current methodologies for entering text in television interfaces are extremely slow and cumbersome, requiring users to use up/down/right/left keys to navigate around an on-screen keyboard. Others simply use wireless computer keyboards to enter text on television, which is not only physically awkward to use in a living room setting, but also creates the perception that functional computing technology—which represents "work" to most users—is now invading the entertainment sanctuary.

A relatively new category of remote control devices includes 3D pointing devices. The phrase "3D pointing" is used in this specification to refer to the ability of an input device to move in three (or more) dimensions in the air, e.g., in front of a display screen, and the corresponding ability of the user interface to translate those motions into user interface commands, e.g., movement of a cursor on the display screen. The transfer of data between the 3D pointing device and another device may be performed wirelessly or via a wire connecting the 3D pointing device to another device. Thus "3D pointing" differs from, for example, conventional computer mouse pointing techniques which use a 2-dimensional planar surface, e.g., a desk surface or mousepad, as a proxy surface from which relative movement of the mouse is translated into cursor movement on the computer display screen.

An example of a 3D pointing device is found in U.S. patent application Ser. No. 11/119,683, filed on May 2, 2005, entitled "Free Space Pointing Devices and Methods", the disclosure of which is incorporated here by reference and which is hereafter referred to as the "'683 application". Therein, an exemplary 3D pointing device includes two buttons and a scroll wheel as input mechanisms in addition to at least one motion sensor. However, future applications which receive input from 3D pointing devices may benefit from other/additional types of input mechanisms.

SUMMARY

According to one exemplary embodiment, a 3D pointing device includes a housing, at least one sensor mounted within the housing for detecting motion of the 3D pointing device and outputting motion data associated therewith, a processing unit for receiving and processing the motion data; and a keyboard disposed on the housing and providing input to the processing unit.

According to another exemplary embodiment, a method for 3D pointing and text entry includes detecting motion of a 3D pointing device, outputting data associated with the detected motion, providing a keyboard on the 3D pointing device, detecting data associated with keys on the keyboard being pressed, and outputting character data associated with the pressed keys.

BRIEF DESCRIPTION OF THE DRAWINGS

The accompanying drawings illustrate exemplary embodiments of the present invention, wherein.

DETAILED DESCRIPTION

Figure 1:
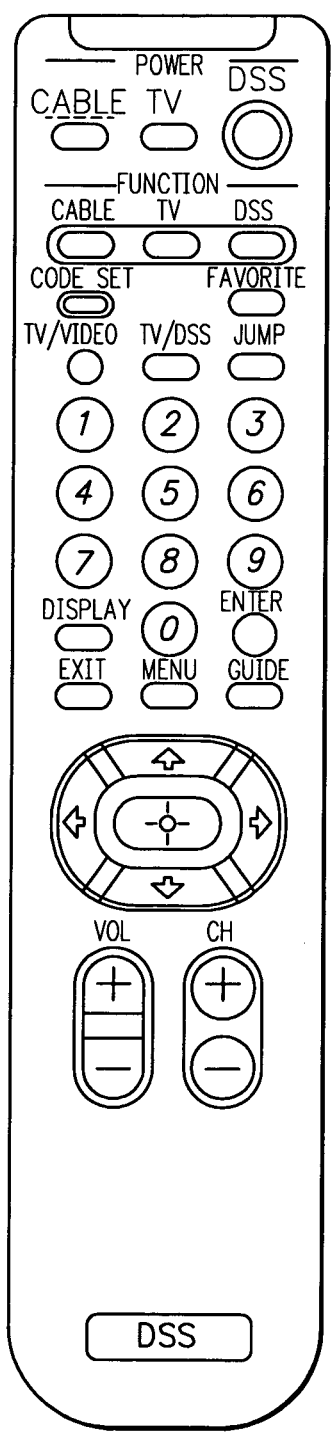
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device according to one of the exemplary embodiments described below. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described in more detail in the above-incorporated '432 application.

Figure 2:
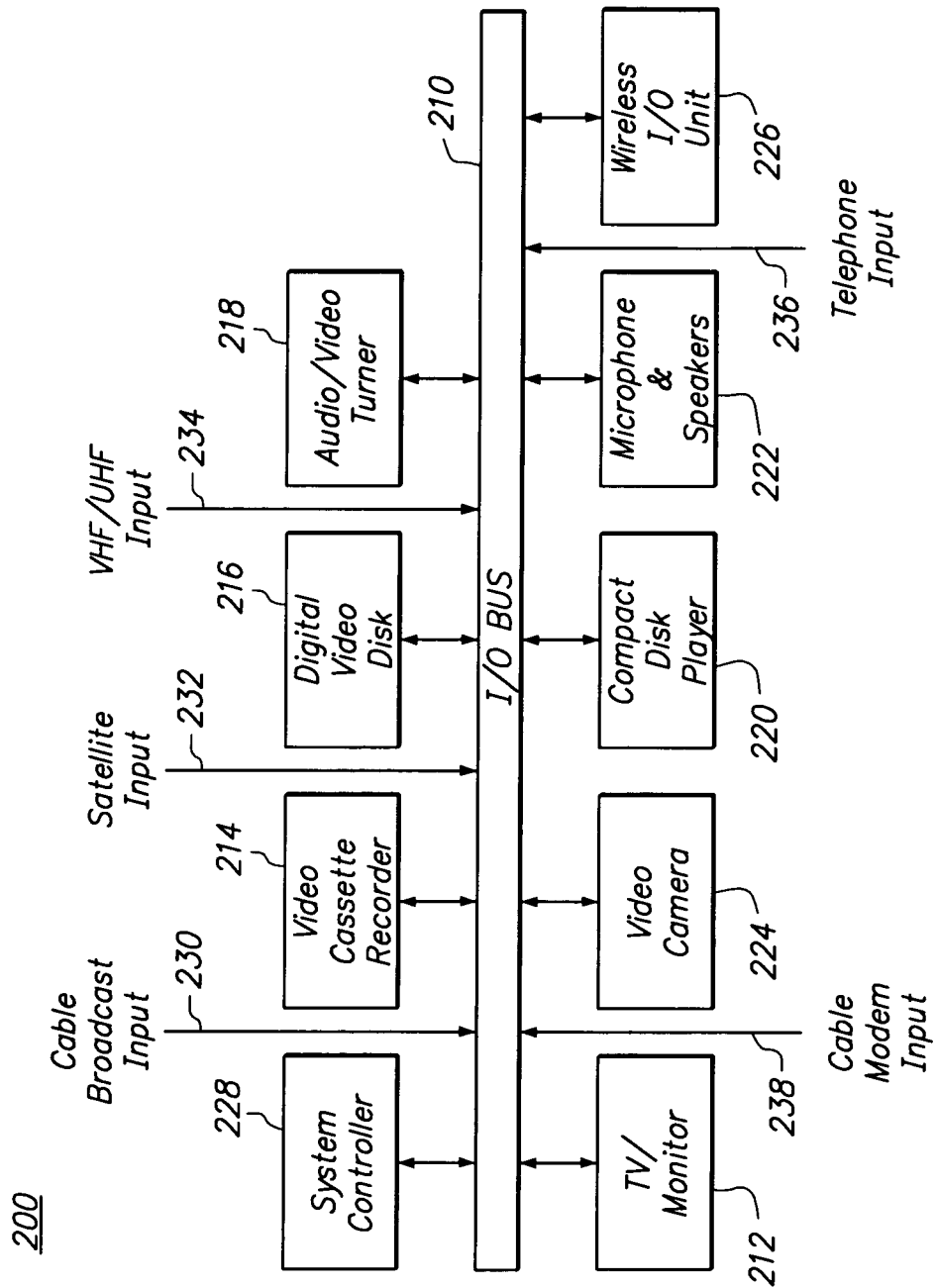
FIG. 2 depicts an exemplary media system in which exemplary embodiments of the present invention can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference '432 application. Alternatively, remote devices in accordance with the present invention can be used in conjunction with other systems, for example computer systems including, e.g., a display, a processor and a memory system or with various other systems and applications.

Figure 3:
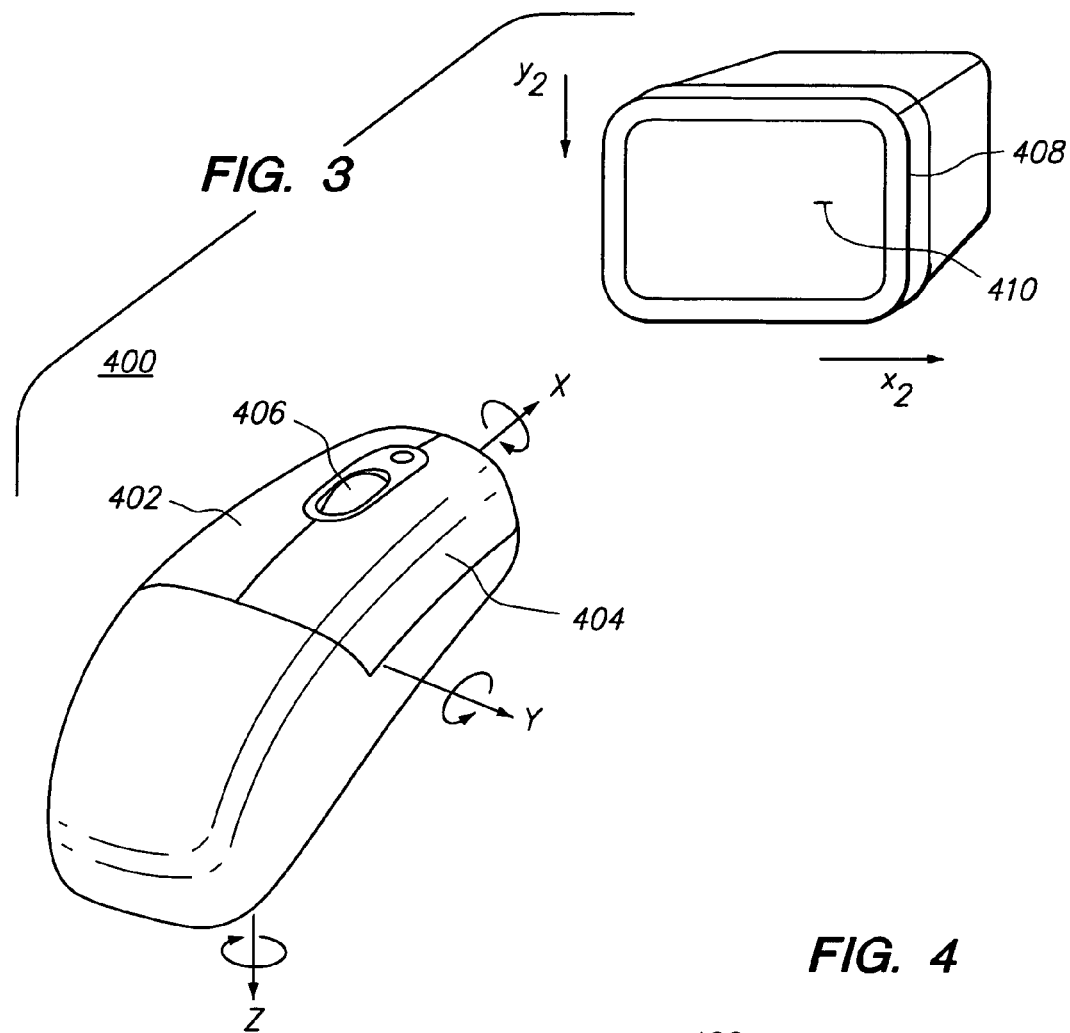
FIG. 3 shows a 3D pointing device according to an exemplary embodiment of the present invention.

As mentioned in the Background section, remote devices which operate as 3D pointers are of particular interest for the present specification. Such devices enable the translation of movement into commands to a user interface. An exemplary 3D pointing device 400 is depicted in FIG. 3. Therein, user movement of the 3D pointing can be defined, for example, in terms of a combination of x-axis attitude (roll), y-axis elevation (pitch) and/or z-axis heading (yaw) motion of the 3D pointing device 400. In addition, some exemplary embodiments of the present invention can also measure linear movement of the 3D pointing device 400 along the x, y, and z axes to generate cursor movement or other user interface commands. In the exemplary embodiment of FIG. 3, the 3D pointing device 400 includes two buttons 402 and 404 as well as a scroll wheel 406, although other exemplary embodiments will include other physical configurations. According to exemplary embodiments of the present invention, it is anticipated that 3D pointing devices 400 will be held by a user in front of a display 408 and that motion of the 3D pointing device 400 will be translated by the 3D pointing device into output which is usable to interact with the information displayed on display 408, e.g., to move the cursor 410 on the display 408. For example, rotation of the 3D pointing device 400 about the y-axis can be sensed by the 3D pointing device 400 and translated into an output usable by the system to move cursor 410 along the $y_2$ axis of the display 408. Likewise, rotation of the 3D pointing device 408 about the z-axis can be sensed by the 3D pointing device 400 and translated into an output usable by the system to move cursor 410 along the $x_2$ axis of the display 408. It will be appreciated that the output of 3D pointing device 400 can be used to interact with the display 408 in a number of ways other than (or in addition to) cursor movement, for example it can control cursor fading, volume or media transport (play, pause, fast-forward and rewind). Input commands may include operations in addition to cursor movement, for example, a zoom in or zoom out on a particular region of a display. A cursor may or may not be visible. Similarly, rotation of the 3D pointing device 400 sensed about the x-axis of 3D pointing device 400 can be used in addition to, or as an alternative to, y-axis and/or z-axis rotation to provide input to a user interface.

Figure 4:
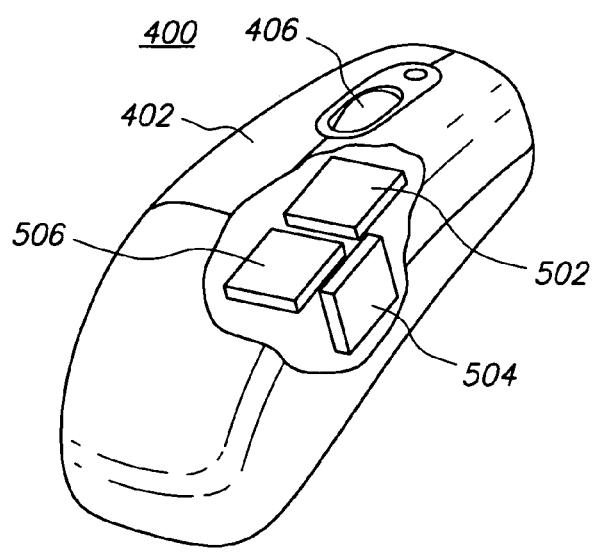
FIG. 4 illustrates a cutaway view of the 3D pointing device in FIG. 4 including two rotational sensors and one accelerometer.

According to one exemplary embodiment of the present invention, two rotational sensors 502 and 504 and one accelerometer 506 can be employed as sensors in 3D pointing device 400 as shown in FIG. 4. The rotational sensors 502 and 504 can, for example, be implemented using ADXRS150 or ADXRS401 sensors made by Analog Devices. It will be appreciated by those skilled in the art that other types of rotational sensors can be employed as rotational sensors 502 and 504 and that the ADXRS150 and ADXRS401 are purely used as an illustrative example. Unlike traditional gyroscopes, these rotational sensors use MEMS technology to provide a resonating mass which is attached to a frame so that it can resonate only along one direction. The resonating mass is displaced when the body to which the sensor is affixed is rotated around the sensor's sensing axis. This displacement can be measured using the Coriolis acceleration effect to determine an angular velocity associated with rotation along the sensing axis. If the rotational sensors 502 and 504 have a single sensing axis (as for example the ADXRS150s), then they can be mounted in the 3D pointing device 400 such that their sensing axes are aligned with the rotations to be measured. For this exemplary embodiment of the present invention, this means that rotational sensor 504 is mounted such that its sensing axis is parallel to the y-axis and that rotational sensor 502 is mounted such that its sensing axis is parallel to the z-axis as shown in FIG. 4. Note, however, that aligning the sensing axes of the rotational sensors 502 and 504 parallel to the desired measurement axes is not required since exemplary embodiments of the present invention also provide techniques for compensating for offset between axes.

One challenge faced in implementing exemplary 3D pointing devices 400 in accordance with the present invention is to employ components, e.g., rotational sensors 502 and 504, which are not too costly, while at the same time providing a high degree of correlation between movement of the 3D pointing device 400, a user's expectation regarding how the user interface will react to that particular movement of the 3D pointing device and actual user interface performance in response to that movement. For example, if the 3D pointing device 400 is not moving, the user will likely expect that the cursor ought not to be drifting across the screen. Likewise, if the user rotates the 3D pointing device 400 purely around the y-axis, she or he would likely not expect to see the resulting cursor movement on display 408 contain any significant $x_2$ axis component. To achieve these, and other, aspects of exemplary embodiments of the present invention, various calibration measurements and calculations are performed by the handheld device 400 which are used to adjust the outputs of one or more of the sensors 502, 504 and 506 and/or as part of the input used by a processor to determine an appropriate output for the user interface based on the outputs of the sensors 502, 504 and 506.

Figure 5:
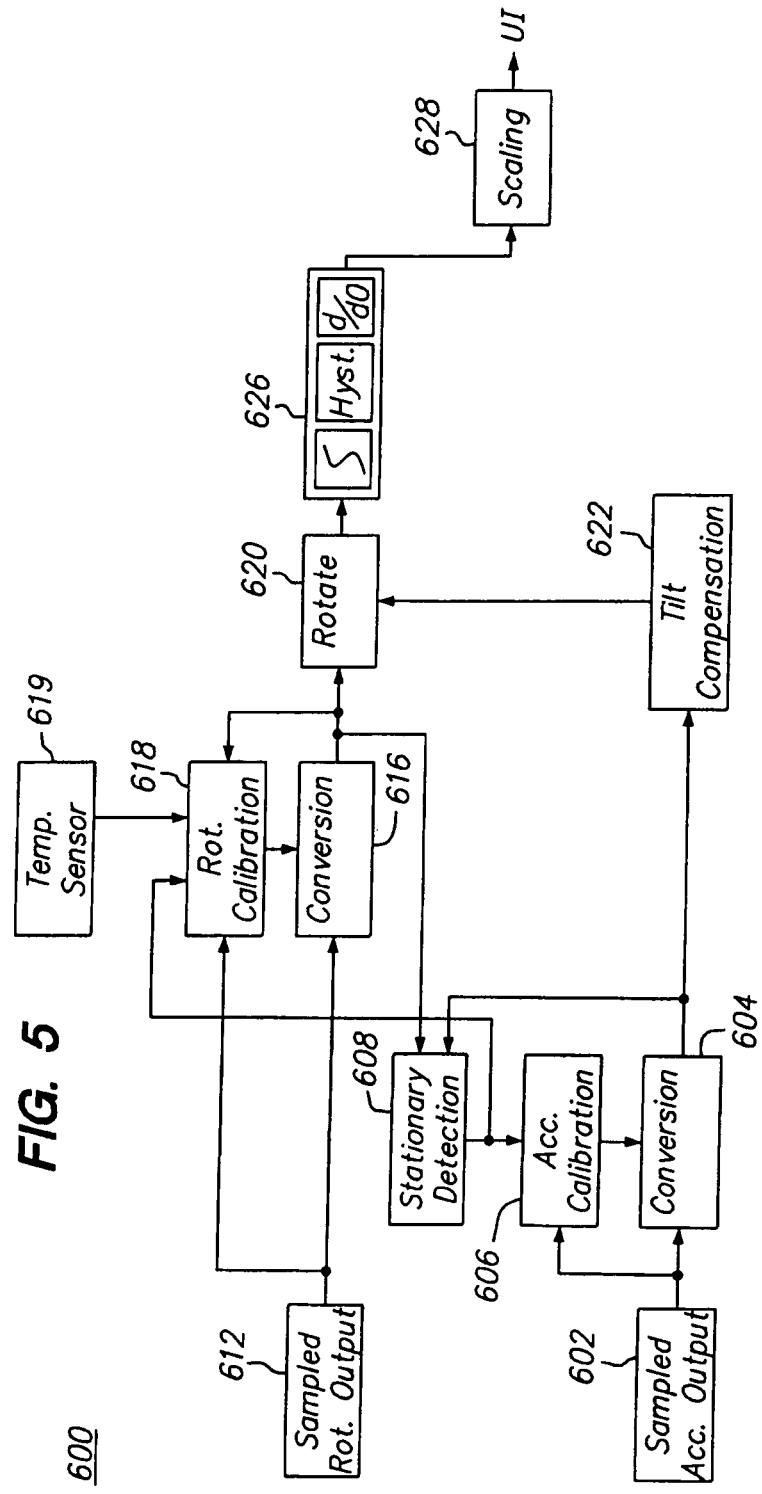
FIG. 5 is a block diagram illustrating processing of data associated with 3D pointing devices according to an exemplary embodiment of the present invention.

A process model 600 which describes the general operation of 3D pointing devices according to exemplary embodiments of the present invention is illustrated in FIG. 5. The rotational sensors 502 and 504, as well as the accelerometer 506, produce analog signals which are sampled periodically, e.g., 200 samples/second. For the purposes of this discussion, a set of these inputs shall be referred to using the notation (x, y, z, αy, αz), wherein x, y, z are the sampled output values of the exemplary three-axis accelerometer 506 which are associated with acceleration of the 3D pointing device in the x-axis, y-axis and z-axis directions, respectively, αy is the sampled output value from rotational sensor 502 associated with the rotation of the 3D pointing device about the y-axis and αz is the sampled output value from rotational sensor 504 associated with rotation of the 3D pointing device 400 about the z-axis.

The output from the accelerometer 506 is provided and, if the accelerometer 506 provides analog output, then the output is sampled and digitized by an A/D converter (not shown) to generate sampled accelerometer output 602. The sampled output values are converted from raw units to units of acceleration, e.g., gravities (g), as indicated by conversion function 604, which also adjusts the sampled output values based on calibration data. The acceleration calibration block 606 provides the calibration values used for the conversion function 604. This calibration of the accelerometer output 602 can include, for example, compensation for one or more of scale, offset and axis misalignment error associated with the accelerometer 506 and can use inputs from stationary detection function 608.

Stationary detection function 608 operates to determine whether the 3D pointing device 400 is, for example, either stationary or active (moving). This categorization can be performed in a number of different ways. One way, is to compute the variance of the sampled input data of all inputs (x, y, z, αy, αz) over a predetermined window, e.g., every quarter of a second. This variance is then compared with a threshold to classify the 3D pointing device as either stationary or active.

Alternatively, the stationary detection function 608 can evaluate inputs from the sensors (in this example at least one rotational sensor and at least one accelerometer) to identify periods when the device is essentially still. Instantaneous rotation and acceleration data (rot, acc) from a preset time period, such as ½ second or 50 samples, can be used in the following algorithm by stationary detection function 608:

$$\max(\text{rot}) - \min(\text{rot}) < 35 \tag{1}$$

$$\max(\text{acc}) - \min(\text{acc}) < 10 \tag{2}$$

for all rotation (rot) and acceleration (acc) components to determine if the device is sufficiently stationary to permit accurate offset computations to be made. For example, when both equations (1) and (2) are true, stationary detection block 608 can output a stationary detection signal (described below) which enables data to be stored in a temperature table. Additional information regarding exemplary stationary detection techniques can be found in the '683 application.

Like the accelerometer data, the sampled rotational data 612 is converted from a sampled unit value into a value associated with a rate of angular rotation, e.g., radians/s, at conversion function 616. This conversion step can also include calibration provided by function 618 to compensate the sampled rotational data for, e.g., offset associated with one or more of linear acceleration and temperature as will be described below. Temperature sensor 619 provides information regarding the current temperature of the handheld device for use in the calibration function.

After conversion/calibration at block 616, the inputs from the rotational sensors 502 and 504 can be further processed to rotate those inputs into an inertial frame of reference, e.g., to compensate for tilt associated with the manner in which the user is holding the 3D pointing device 400, at function 620. Tilt compensation performed by block 622 is described in the above incorporated by reference '683 patent application.

Once the sensor readings have been calibrated, processed into readings indicative of angular rotation of the 3D pointing device 400, and compensated for tilt, post-processing can be performed at blocks 626 and 628. Exemplary post-processing can include compensation for various factors such as human tremor. Although tremor may be removed using several different methods, one way to remove tremor is by using hysteresis. The angular velocity produced by rotation function 620 is integrated to produce an angular position. Hysteresis of a calibrated magnitude is then applied to the angular position. The derivative is taken of the output of the hysteresis block to again yield an angular velocity. The resulting output is then scaled at function 628 (e.g., based on the sampling period) and used to generate a result within the user interface (UI), e.g., movement of a cursor 410 on a display 408.

Figure 6:
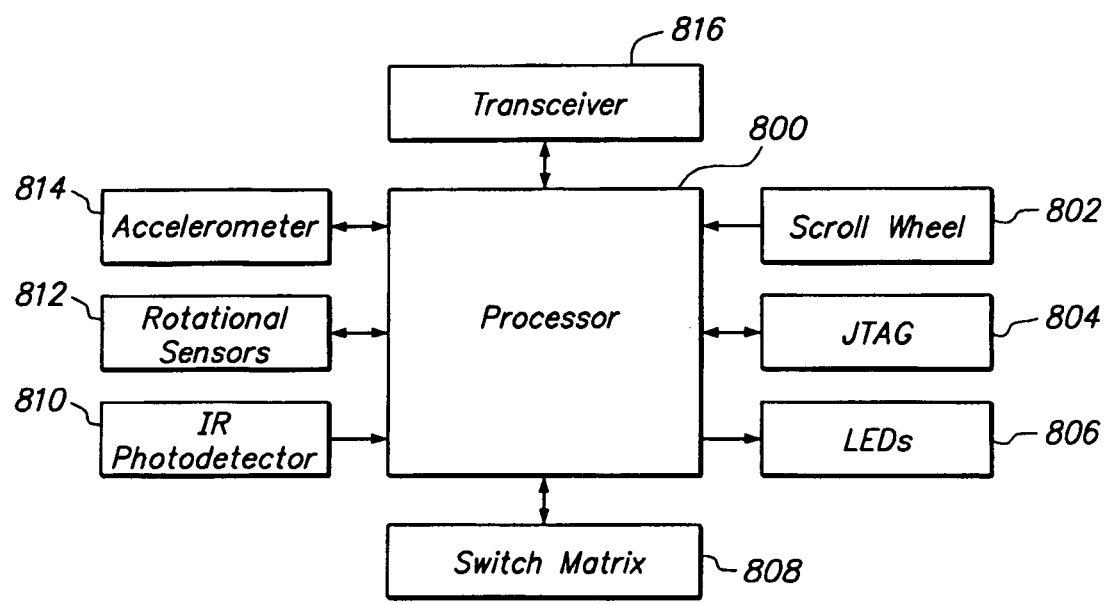
FIG. 6 depicts a hardware architecture of a 3D pointing device according to an exemplary embodiment of the present invention.

Having provided a process description of an exemplary 3D pointing devices according to the present invention, FIG. 6 illustrates an exemplary hardware architecture. Therein, a processor 800 communicates with other elements of the 3D pointing device including a scroll wheel 802, JTAG 804, LEDs 806, switch matrix 808, IR photodetector 810, temperature sensor 811, rotational sensors 812, accelerometer 814 and transceiver 816. The scroll wheel 802 is an optional input component which enables a user to provide input to the interface by rotating the scroll wheel 802 clockwise or counterclockwise. JTAG 804 provides the programming and debugging interface to the processor. LEDs 806 provide visual feedback to a user, for example, when a button is pressed. Switch matrix 808 receives inputs, e.g., indications that a button on the 3D pointing device 400 has been depressed or released, that are then passed on to processor 800. The optional IR photodetector 810 can be provided to enable the exemplary 3D pointing device to learn IR codes from other remote controls. Rotational sensors 812 provide readings to processor 800 regarding, e.g., the y-axis and z-axis rotation of the 3D pointing device as described above. Accelerometer 814 provides readings to processor 800 regarding the linear acceleration of the 3D pointing device 400 which can be used as described below, e.g., compensate for errors which linear acceleration introduces into the rotational readings generated by rotational sensors 812. Transceiver 816 is used to communicate information to and from 3D pointing device 400, e.g., to the system controller 228 or to a processor associated with a computer. The transceiver 816 can be a wireless transceiver, e.g., operating in accordance with the Bluetooth standards for short-range wireless communication or an infrared transceiver. Alternatively, 3D pointing device 400 can communicate with systems via a wireline connection.

Keyboard Input

Figure 7:
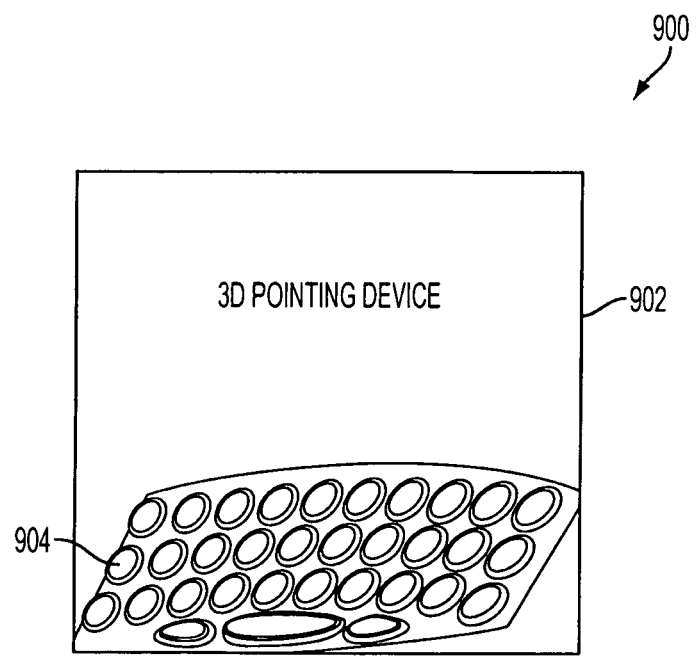
FIG. 7 shows a 3D pointing device including a keyboard according to an exemplary embodiment of the present invention.

According to exemplary embodiments of the present invention, a 3D pointing device can include a keyboard as an input mechanism. This is shown conceptually in FIG. 7, wherein the 3D pointing device 900 includes a housing 902 and a keyboard 904. Although illustrated as rectangular in FIG. 7, housing 902 may also be non-rectangular and include a gripping surface to permit a user to easily hold the 3D pointing device 900 and move it, e.g., in front of a television or other display device. Keyboard 904 can, for example, be a standard "QWERTY" (Scholes) keyboard (as shown) or may be any other type of keyboard having more or fewer keys arranged in any desired manner (collectively "non-QWERTY keyboards"). Keyboard 904 can be electrically connected (directly or indirectly) to processing unit 808, such that pressing each of the keys associated therewith will generate one or more input signals to the processing unit 808. The keyboard 904 may be provided to the 3D pointing device as the sole input mechanism (in addition to the at least one motion sensor) or in addition to other input mechanisms, e.g., button(s) and/or scroll wheel(s). Housing 902 can, for example, include the circuitry described above with respect to FIGS. 1-6 to provide 3D pointing capability. Alternatively, housing 902 may house other types of 3D pointing circuitry, e.g., based on gyroscopes as described in U.S. Pat. No. 5,440,326, the disclosure of which is incorporated here by reference.

As mentioned above, the 3D pointing device 900 may be provided as the sole input mechanism (other than the at least one motion sensor). In such a case, user interface commands other than text entry, e.g., zoom-in, zoom-out, scrolling, etc., may be mapped to a subset of the keys on the keyboard 904. For example, a first one of the keys may be used to indicate a user command to zoom-in on a user interface (not shown) with which the 3D pointing device 900 is communicating. Similarly, a second one of the keys may be used to indicate a user command to zoom-out on the user interface. A third one of the keys may be used to indicate that a user interface object, to which a cursor controlled by the 3D pointing device 900 is pointing, is selected by a user.

According to some exemplary embodiments, it may be desirable to alternate operation of the 3D pointing device 900 between a 3D pointing mode and a text entry mode, e.g., using keyboard 904. When the 3D pointing device 300 is in the 3D pointing mode, data from the at least one motion sensor is transmitted (either directly or after some processing within the 3D pointing device as described above) to the device controlling the user interface, e.g., a set-top box. Alternatively, when the 3D pointing device 300 is in a text entry mode, data from the at least one motion sensor is not transmitted to the device controlling the user interface (or is transmitted, but is not used to move a cursor). Instead, in text entry mode, when keys on the keyboard 904 are depressed, corresponding character data or codes are transmitted from the 3D pointing device 900 to the device controlling the user interface. By having two modes, exemplary embodiments enable a user to type text in without having the cursor move over the display screen during that time.

Switching between 3D pointing mode and text entry mode can be accomplished in a number of different ways. For example, an explicit mode switch (hardware) can be provided on the 3D pointing device 900 itself. Alternatively, a mode switch can be provided in the user interface software. For example, an "enter text entry mode" icon can be displayed on the user interface. If the user moves the cursor over this icon (while in 3D pointing mode) and selects this icon, the user interface can change over to text entry mode, e.g., by removing the cursor and disregarding motion data from the 3D pointing device until such time as the mode is switched back. Yet another way to switch between modes is based upon usage of the input devices provided on the 3D pointing device 900. For exemplary embodiments wherein the keyboard 904 is the only input device (other than the at least one motion sensor) and where, as described above, a subset of the keys on the keyboard are used for specific user interface commands (as opposed to, or in addition to, functioning to provide character input), depressing any of those keys can operate to place the device 900 into 3D pointing mode. Likewise, depressing any of the other keys, i.e., those keys which are only used to provide alphanumeric text input, can operate to place the device 900 into text entry or keyboard mode.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A 3D pointing device whose 3D pointing determines a position of a cursor displayed on a remote user interface, comprising:
    a housing;
    at least one inertial sensor mounted within said housing and configured to detect motion of said 3D pointing device and to output motion data associated therewith, wherein the at least one inertial sensor includes at least one rotational sensor configured to detect rotational motion of the 3D pointing device about at least two axes and at least one accelerometer configured to detect acceleration about at least three axes,
    wherein said motion data includes outputs of the at least one inertial sensor and the at least one accelerometer;
    a processing unit configured to receive and process said motion data configured to output values associated with said motion of said 3D pointing device;
    a keyboard including a first set of keys disposed on said housing and configured to enable text input to said processing unit;
    a scroll wheel disposed on said housing and configured to enable scroll input to said processing unit;
    at least one button disposed on said housing and configured to enable input associated with pointing; and
    a transmitter configured to transmit said output values associated with said motion of said 3D pointing device and said text input received from said processing unit, from said 3D pointing device towards said remote user interface,
    further wherein said 3D pointing device is configured to switch between a 3D pointing mode and a text entry mode wherein movement of the 3D pointing device corresponds to cursor movement on said remote user interface, wherein by pointing to an icon displayed on said remote user interface and selecting said icon, said remote user interface changes to said text entry mode and disregards any further movement of the 3D pointing device.

2. The 3D pointing device of claim 1, wherein said keyboard is a QWERTY keyboard.

3. The 3D pointing device of claim 1, wherein said keyboard is a non-QWERTY keyboard.

4. The 3D pointing device of claim 1, wherein said at least one sensor includes a gyroscope.

5. The 3D pointing device of claim 1, wherein said processing unit processes said motion data to compensate for tilt of said 3D pointing device to output said values.

* * * * *